United States Patent
Ranzie

(10) Patent No.: US 12,424,970 B2
(45) Date of Patent: Sep. 23, 2025

(54) HEATED SOLAR PANEL DEVICE

(71) Applicant: Alfonse Ranzie, Bay Shore, NY (US)

(72) Inventor: Alfonse Ranzie, Bay Shore, NY (US)

(*) Notice: Subject to any disclaimer, the term of this patent is extended or adjusted under 35 U.S.C. 154(b) by 101 days.

(21) Appl. No.: 18/402,402

(22) Filed: Jan. 2, 2024

(65) Prior Publication Data

US 2025/0219572 A1    Jul. 3, 2025

(51) Int. Cl.
| | |
|---|---|
| *H02S 40/12* | (2014.01) |
| *B08B 3/08* | (2006.01) |
| *F24S 40/20* | (2018.01) |
| *H02S 20/23* | (2014.01) |
| *H02S 40/40* | (2014.01) |
| *H05B 1/02* | (2006.01) |

(52) U.S. Cl.
CPC .............. *H02S 40/12* (2014.12); *B08B 3/08* (2013.01); *F24S 40/20* (2018.05); *H02S 20/23* (2014.12); *H02S 40/40* (2014.12); *H05B 1/0227* (2013.01); *H05B 2214/02* (2013.01)

(58) Field of Classification Search
None
See application file for complete search history.

(56) References Cited

U.S. PATENT DOCUMENTS

| | | |
|---|---|---|
| 4,333,444 A | 6/1982 | Sell |
| 2005/0199282 A1 | 9/2005 | Oleinick |
| 2011/0269087 A1 | 11/2011 | DuChateau |
| 2012/0037215 A1 | 2/2012 | Ball |
| 2013/0255665 A1 | 10/2013 | Nickel |
| 2014/0041713 A1* | 2/2014 | Adler ............... H05B 3/26 |
| | | 136/251 |
| 2015/0021310 A1* | 1/2015 | Van Straten ......... H02S 40/40 |
| | | 219/213 |
| 2020/0336101 A1* | 10/2020 | Stewart ............... H02S 40/10 |

FOREIGN PATENT DOCUMENTS

| | | | |
|---|---|---|---|
| CN | 204156540 | 2/2015 | |
| KR | 101230545 B1 * | 2/2013 | .......... F24S 40/20 |

OTHER PUBLICATIONS

Machine translation of KR101230545B1 (Year: 2013).*

* cited by examiner

*Primary Examiner* — Ryan S Cannon

(57) ABSTRACT

A heated solar panel device includes a housing which has a planar attachment surface attached to a roof of a building and a plurality of solar panels is each mounted in the housing. A heating unit is positioned in the housing thereby facilitating the heating unit to heat each of the plurality of solar panels to melt snow and ice that collects on the plurality of solar panels thereby ensuring proper functioning of the plurality of solar panels. A control unit is positioned in the housing and the control unit actuates the heating unit when the control unit senses a temperature that is below a trigger temperature. A rechargeable battery is in communication with the control unit such that the rechargeable battery is charged by the plurality of solar panels. Additionally, the rechargeable battery is in communication with the heating unit for supplying electrical power to the heating unit.

7 Claims, 6 Drawing Sheets

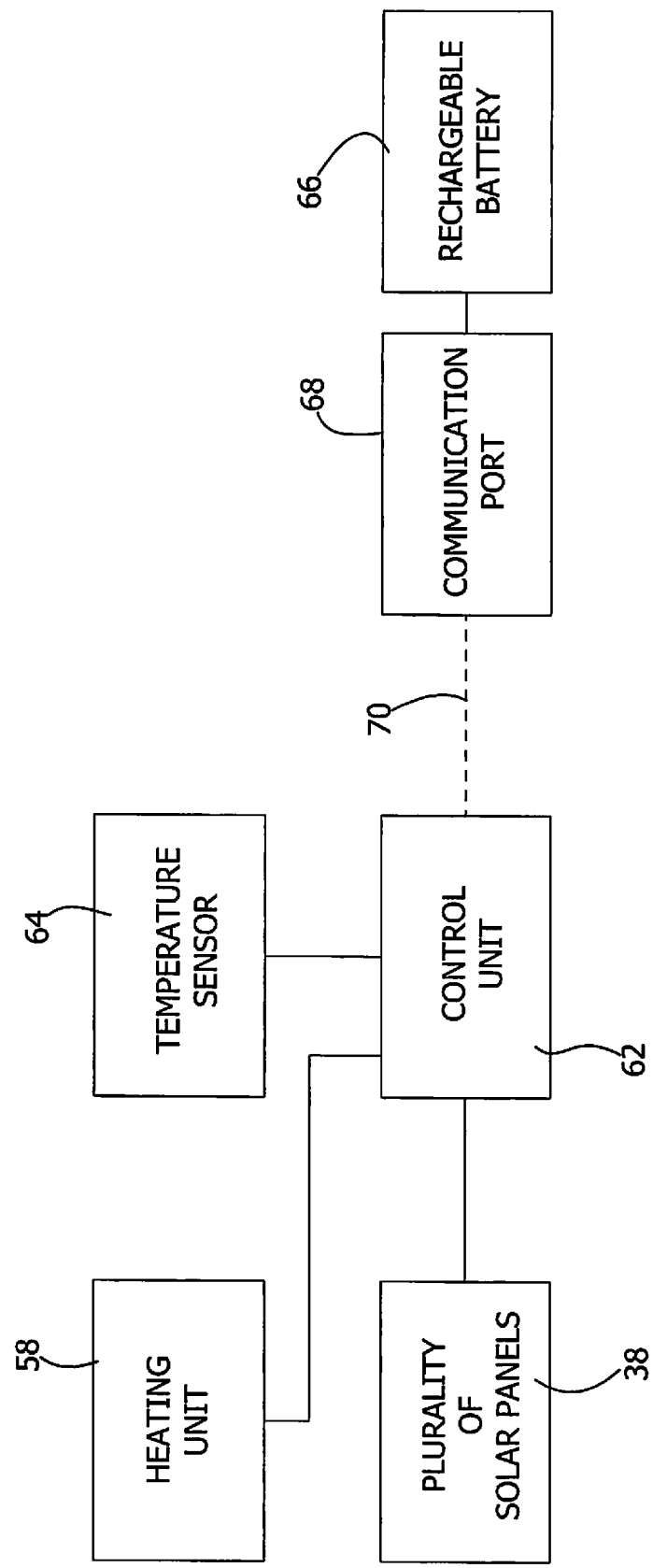

HEATED SOLAR PANEL DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to solar panel devices and more particularly pertains to a new solar panel device for ensuring that snow and ice do not accumulate on solar panels. The device includes a housing and a plurality of solar panels positioned in the housing and a heating unit positioned beneath the plurality of solar panels for heating the plurality of solar panels. The device includes a chemically reactive layer applied to each of the solar panels and a spray bottle which contains a chemical reactant that can be sprayed on the chemically reactive layer to produce an exothermic chemical reaction to melt the snow and ice on the solar panels.

(2) Description of Related Art Including Information Disclosed Under 37 CFR 1.97 and 1.98

The prior art relates to solar panel devices including a solar panel device that includes solar panels disposed in a thermally conductive housing for warming the solar panels and a solar panel device that includes solar panels disposed in a housing and a transparent panel which seals the solar panels in the housing and a heating element integrated into the transparent panel for melting ice and snow on the transparent panel and a variety of solar collector devices which are each heated by solar energy for inhibiting the formation of ice and snow on solar panels. In no instance does the prior art disclose a solar panel device that includes a housing and a plurality of solar panels positioned in the housing and a heating unit that is positioned beneath the solar panels for heating the solar panels to melt snow and ice on the solar panels.

BRIEF SUMMARY OF THE INVENTION

An embodiment of the disclosure meets the needs presented above by generally comprising a housing which has a planar attachment surface attached to a roof of a building and a plurality of solar panels is each mounted in the housing. A heating unit is positioned in the housing thereby facilitating the heating unit to heat each of the plurality of solar panels to melt snow and ice that collects on the plurality of solar panels thereby ensuring proper functioning of the plurality of solar panels. A control unit is positioned in the housing and the control unit actuates the heating unit when the control unit senses a temperature that is below a trigger temperature. A rechargeable battery is in communication with the control unit such that the rechargeable battery is charged by the plurality of solar panels. Additionally, the rechargeable battery is in communication with the heating unit for supplying electrical power to the heating unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 6 is a schematic view of an embodiment of the disclosure.

DETAILED DESCRIPTION OF THE INVENTION

Figure 1:
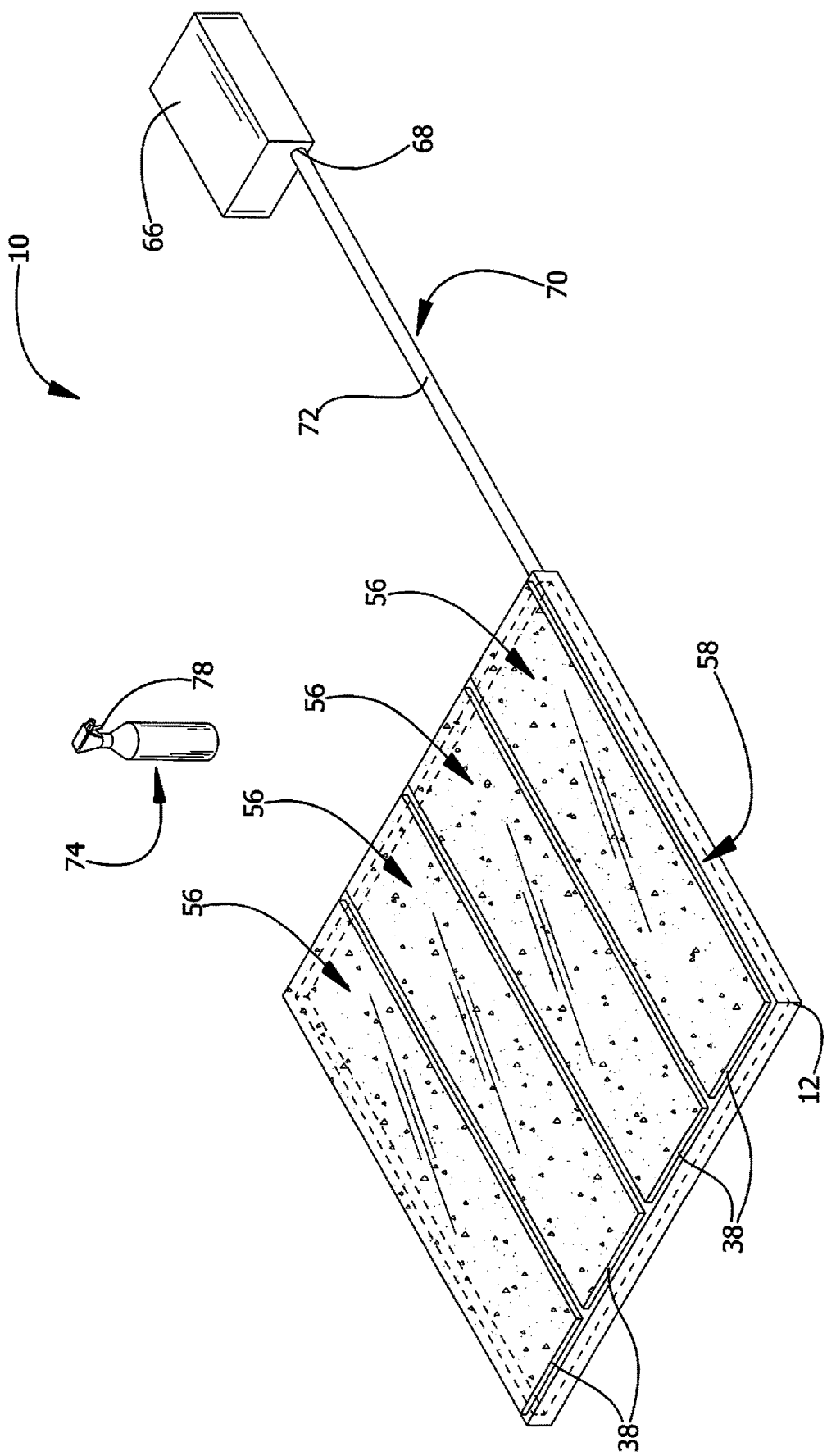
FIG. 1 is a top perspective view of a heated solar panel device according to an embodiment of the disclosure.
Figure 2:
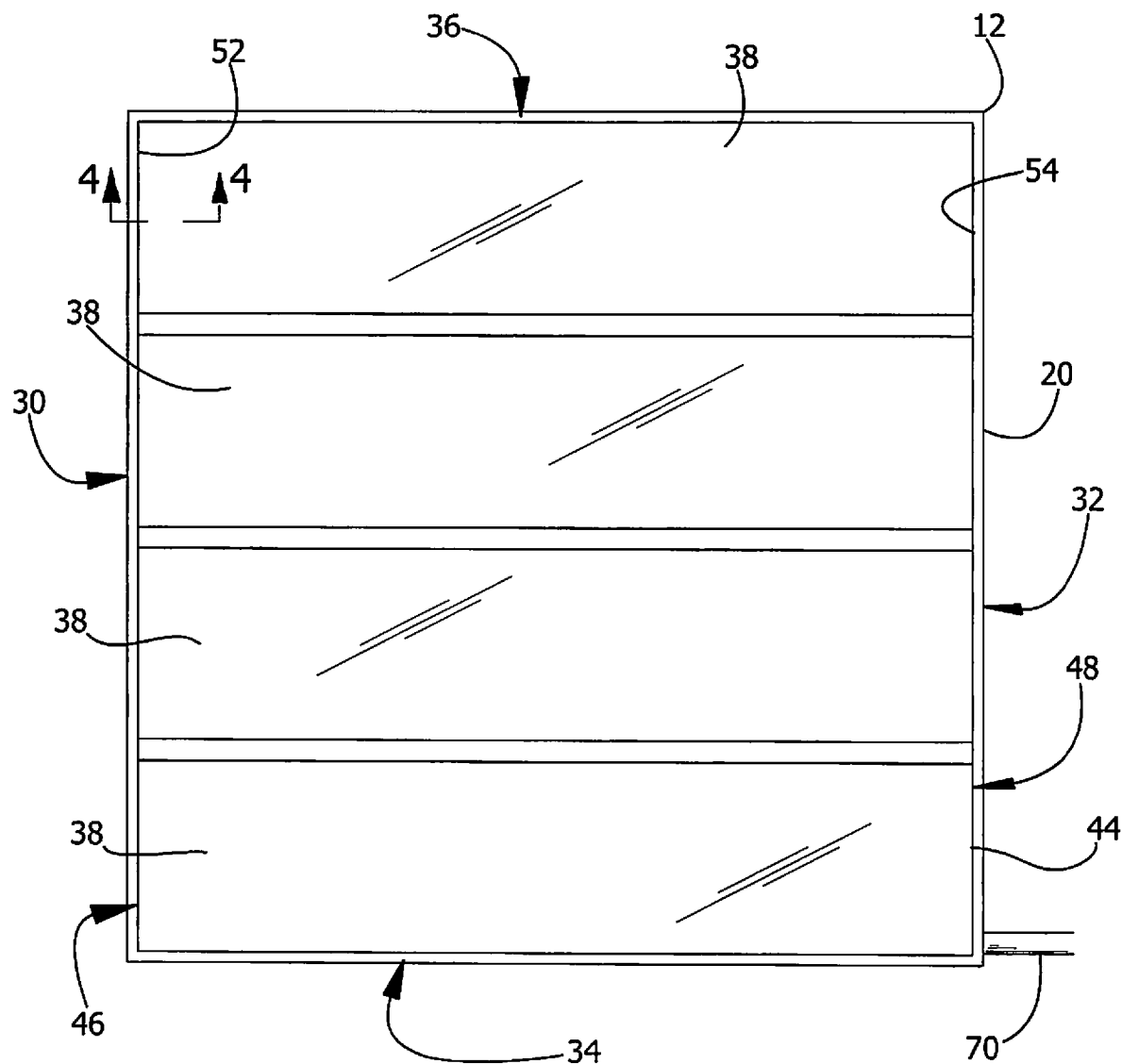
FIG. 2 is a top view of a housing and a plurality of solar panels of an embodiment of the disclosure.
Figure 3:
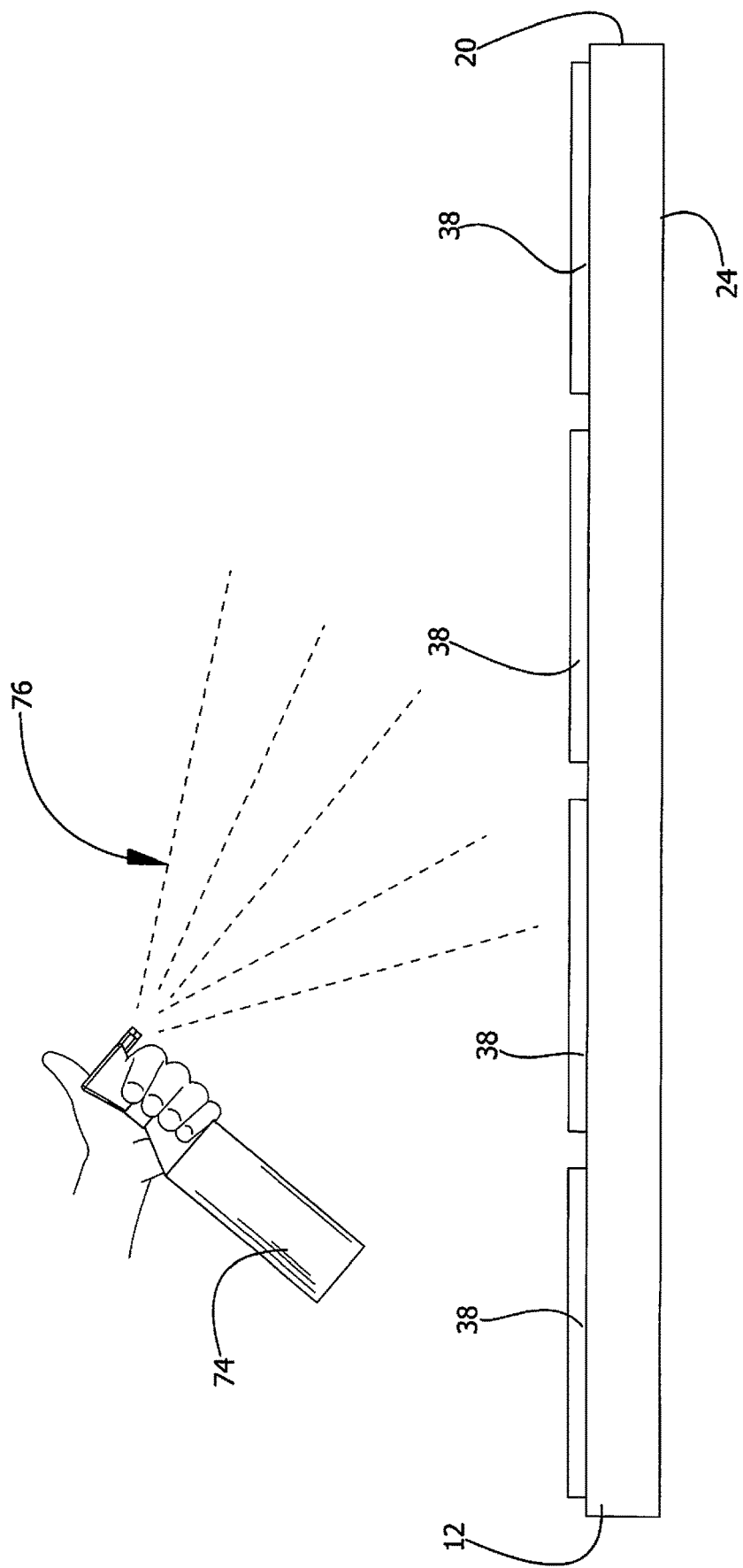
FIG. 3 is a front in-use view of an embodiment of the disclosure showing a chemical reactant being sprayed onto a plurality of solar panels.
Figure 4:
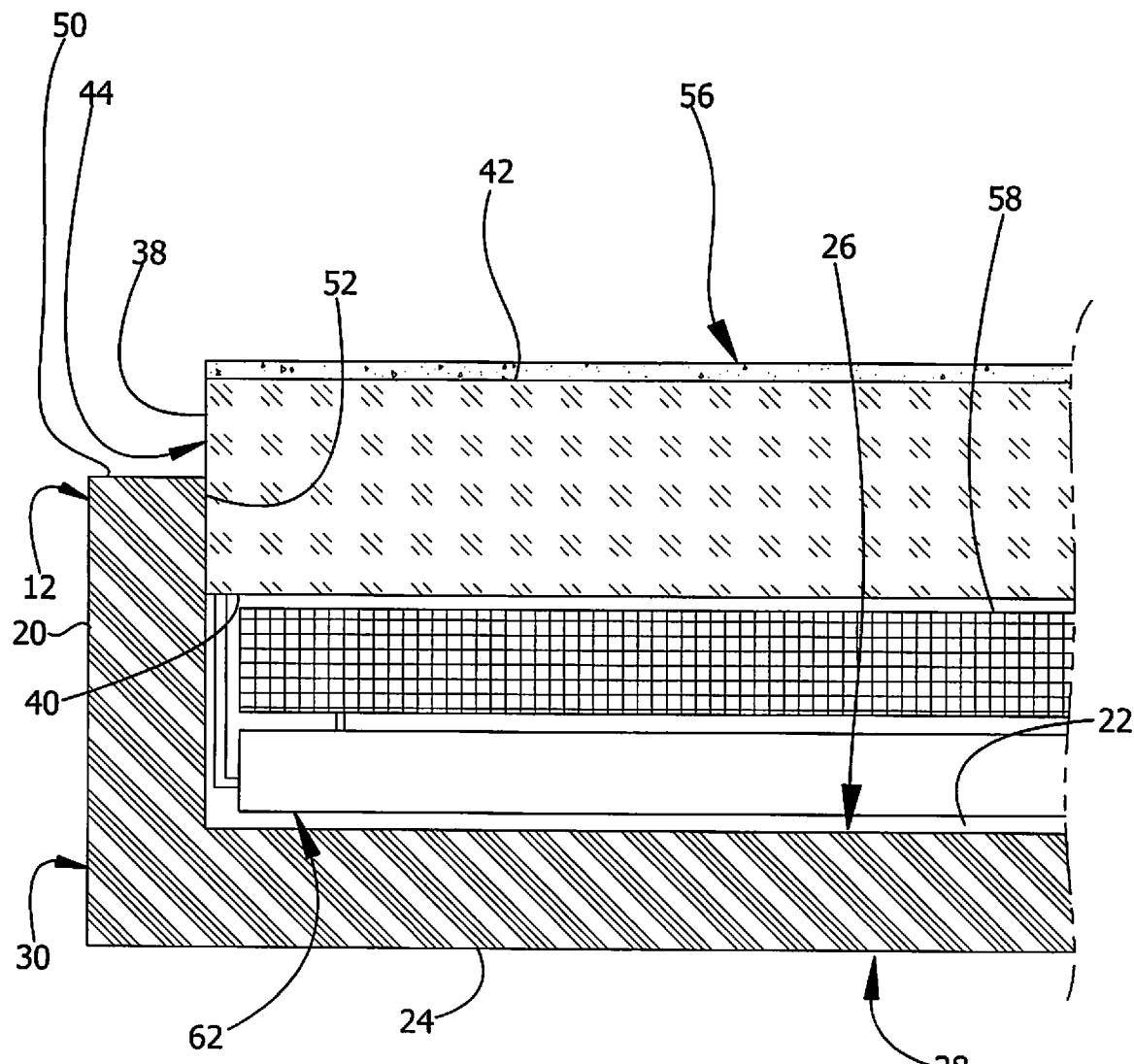
FIG. 4 is a cross sectional view taken along line 4-4 of FIG. 2 of an embodiment of the disclosure.
Figure 5:
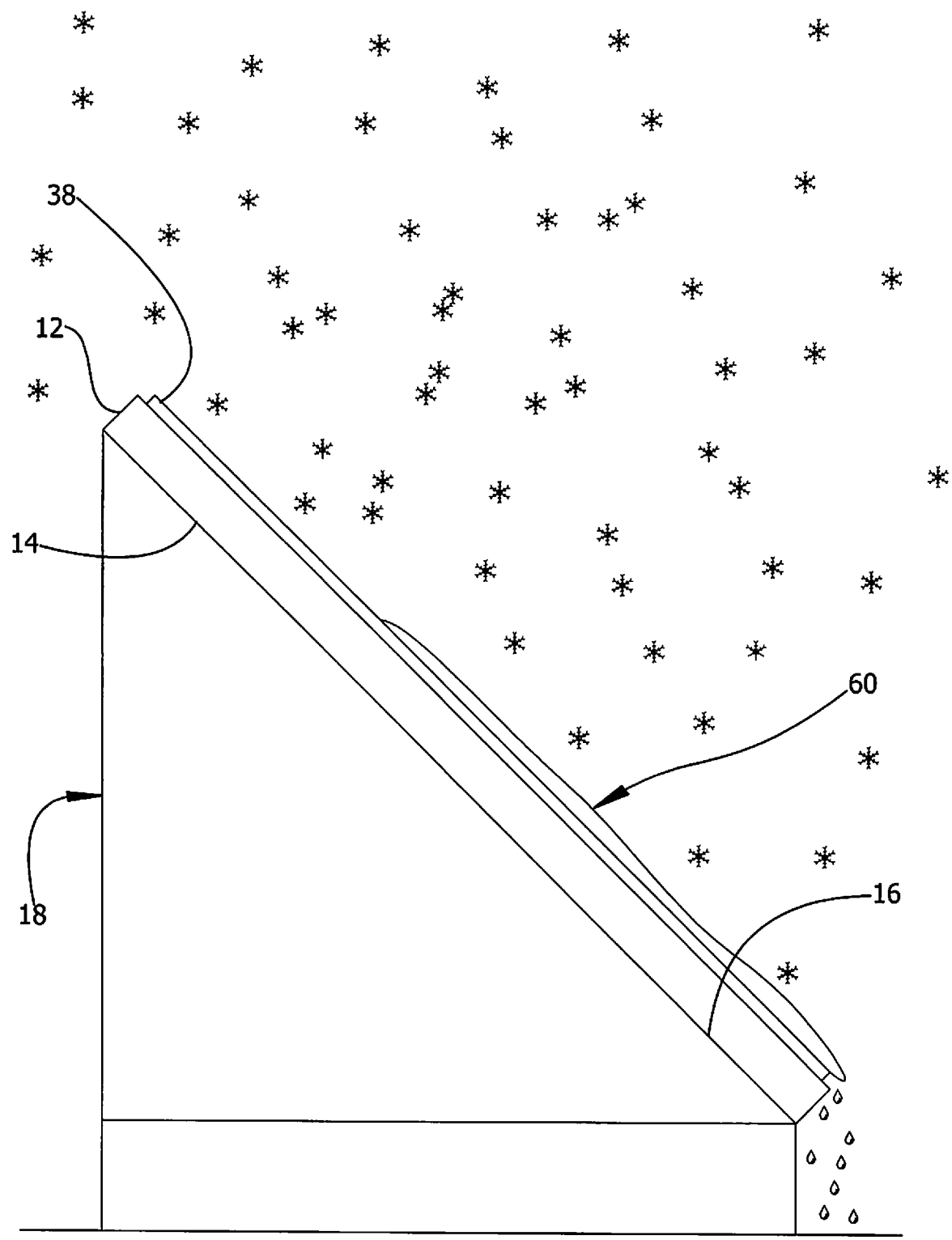
FIG. 5 is a perspective in-use view of an embodiment of the disclosure.

With reference now to the drawings, and in particular to FIGS. 1 through 6 thereof, a new solar panel device embodying the principles and concepts of an embodiment of the disclosure and generally designated by the reference numeral 10 will be described.

As best illustrated in FIGS. 1 through 6, the heated solar panel device 10 generally comprises a housing 12 that has a planar attachment surface 14 which is attached to a roof 16 of a building 18. The building 18 may be residence, for example, or any other type of occupancy which employs solar power. The housing 12 has a perimeter wall 20 extending upwardly from an upper surface 22 of a basal wall 24 of the housing 12 such that the perimeter wall 20 defines a space 26 in the housing 12; a lower surface 28 of the basal wall 24 defines the planar attachment surface 14. Furthermore, the perimeter wall 20 has a forward side 30, a rear side 32, a first lateral side 34 and a second lateral side 36.

A plurality of solar panels 38 is provided and each of the plurality of solar panels 38 is mounted in the housing 12 such that each of the plurality of solar panels 38 is exposed to sunlight thereby converting the sunlight into electrical energy. Each of the plurality of solar panels 38 has a bottom surface 40, a top surface 42 and a perimeter surface 44 extending between the top surface 42 and the bottom surface 40; the perimeter surface 44 of each of the plurality of solar panels 38 has a front side 46 and a back side 48 and each of the plurality of solar panels 38 is elongated between the front side 46 and the back side 48. Each of the plurality of solar panels 38 is positioned in the space 26 defined by the perimeter wall 20 of the housing 12 having the bottom surface 40 of each of the plurality of solar panels 38 being spaced from the upper surface 22 of the basal wall 24 of the housing 12. Additionally, each of the plurality of solar panels 38 extends upwardly beyond a top edge 50 of the perimeter wall 20 of the housing 12 such that the top surface 42 of each of the plurality of solar panels 38 is spaced upwardly from the top edge 50 of the perimeter wall 20 of the housing 12. The front side 46 of the perimeter surface 44 of each of the plurality of solar panels 38 abuts an inwardly facing surface 52 of the forward side 30 of the perimeter wall 20 of the housing 12. The back side 48 of the perimeter surface 44 of each of the plurality of solar panels 38 abuts an inwardly facing surface 54 of the rear side 32 of the perimeter wall 20 of the housing 12. Furthermore, the solar panels 38 are evenly spaced apart from each other and are distributed between the first lateral side 34 and the second lateral side 36 of the perimeter wall 20 of the housing 12.

Each of the plurality of solar panels 38 includes a chemically reactive layer 56 which is applied to the top surface 42 of each of the plurality of solar panels 38. Furthermore, the chemically reactive layer 56 on each of the plurality of solar panels 38 completely covers the top surface 42 of each of the plurality of solar panels 38. The chemically reactive layer 56 is comprised of a translucent material thereby facilitating sunlight to pass through the chemically reactive layer 56 to facilitate normal functioning of the solar panels 38. Additionally, the chemically reactive layer 56 may include sodium chloride, for example, which is exposed to the environment and which is sufficiently diffuse such that the Sodium Chloride does not block sunlight from passing through the chemically reactive layer 56.

A heating unit 58 is positioned in the housing 12 such that the heating unit 58 is positioned beneath each of the plurality of solar panels 38. Furthermore, the heating unit 58 is in thermal communication with each of the plurality of solar panels 38 thereby facilitating the heating unit 58 to heat each of the plurality of solar panels 38 when the heating unit 58 is turned on. In this way the heating unit 58 can melt snow and ice 60 that collects on the plurality of solar panels 38 thereby ensuring proper functioning of the plurality of solar panels 38. The heating unit 58 is positioned in the space 26 defined in the housing 12 such that the heating unit 58 is between the bottom surface 40 of each of the plurality of solar panels 38 and the upper surface 22 of the basal wall 24 of the housing 12. Additionally, the heating unit 58 may comprise an electrical heating element, for example, which has an operational temperature ranging between approximately 60.0 degrees Fahrenhiet and 100.0 degrees Fahrenheit. In this way the heating unit 58 can produce heat that is sufficient to quickly melt snow and ice 60 without damaging the solar panels 38 due to warpage, for example, or other types of damage that can result from exposure to excessive heat.

A control unit 62 is positioned in the housing 12 and the control unit 62 is in communication with each of the plurality of solar panels 38 and the heating unit 58. The control unit 62 has a temperature sensor 64 which is in thermal communication with ambient air to determine the temperature of ambient air. The control unit 62 actuates the heating unit 58 when the temperature sensor 64 senses a temperature that is below a trigger temperature. Conversely, the control unit 62 de-actuates the heating unit 58 when the temperature sensor 64 senses a temperature that is above the trigger temperature.

The control unit 62 is positioned between the heating unit 58 and the basal wall 24 of the housing 12. Additionally, the control unit 62 is electrically coupled to each of the plurality of solar panels 38 and the heating unit 58 is electrically coupled to the heating unit 58. The temperature sensor 64 may comprise an electronic temperature sensor or the like and the trigger temperature may range between approximately 20.0 degrees Fahrenheit and 30.0 degrees Fahrenheit. In this way the heating unit 58 is actuated when the temperature sensed by the temperature sensor 64 is below that of the freezing point of water.

A rechargeable battery 66 is provided which is in communication with the control unit 62 such that the rechargeable battery 66 is charged by the plurality of solar panels 38. The rechargeable battery 66 is in communication with the heating unit 58 for supplying electrical power to the heating unit 58. Additionally, the rechargeable battery 66 is remotely positioned with respect to the housing 12 thereby facilitating the rechargeable battery 66 to be located within the building 18, for example, or other location that is protected from weather. The rechargeable battery 66 has a communication port 68 and the rechargeable battery 66 may comprise a rechargeable battery of any conventional design that is commonly employed to store electrical energy that is produced with solar panels.

A conductor 70 is coupled between the housing 12 and the rechargeable battery 66 and the conductor 70 is comprised of an electrically conductive material. Additionally, the conductor 70 has an outer shielding 72 which is comprised of an electrically insulating material such that the outer shielding 72 inhibits electrical communication between the conductor 70 and the environment in which the conductor 70 is positioned. Furthermore, the conductor 70 is electrically coupled between the control unit 62 and the communication port 68 of the rechargeable battery 66. The conductor 70 may have a length of at least 15.0 meters thereby facilitating the rechargeable battery 66 to be located within the building 18, for example, to protect the rechargeable battery 66 from the elements.

A spray bottle 74 is provided which contains a chemical reactant 76. The spray bottle 74 sprays the chemical reactant 76 onto the chemically reactive layer 56 on each of the plurality of solar panels 38 when a trigger 78 on the spray bottle 74 is manipulated. Furthermore, the chemical reactant 76 initiates an exothermic chemical reaction with the chemically reactive layer 56 when the chemical reactant 76 is applied to the chemically reactive layer 56. In this way the chemical reactant 76 facilitates the chemically reactive layer 56 to melt snow and ice 60 that has accumulated on the plurality of solar panels 38. The chemical reactant 76 may comprise a solution of iron and activated carbon, for example, which reacts with the sodium chloride in the chemically reactive layer 56 and ambient oxygen, for example, such that the exothermic chemical reaction has a temperature of no greater than 160.0 degrees Fahrenheit. In this way the temperature produced by the exothermic chemical reaction is sufficient to quickly melt snow and ice 60 without damaging the plurality of solar panels 38.

In use, the heating unit 58 is actuated when the temperature sensor 64 senses an ambient temperature that is below the trigger temperature. In this way the solar panels 38 are heated to melt any snow or ice that has accumulated on the solar panels 38. Thus, the plurality of solar panels 38 can be continually exposed to sunlight in Northern locations, for example, that commonly experience winter conditions which include snow and ice 60. The chemical reactant 76 can be sprayed directly onto the chemically reactive layer 56 on the plurality of solar panels 38 to facilitate the resulting exothermic chemical reaction to melt snow and ice 60 that has accumulated on the solar panels 38. The chemical reactant 76 can be employed in conjunction with the heating unit 58 or the chemical reactant 76 can be employed in lieu of the heating unit 58. In this way the plurality of solar panels 38 can remain clear of snow and ice 60 in the event that either the heating unit 58 or the control unit 62 has experienced a malfunction.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A heated solar panel device for inhibiting the collection of snow upon a solar panel to ensure said solar panel is continuously exposed to sunlight, said device comprising:
   a housing having a planar attachment surface being attached to a roof of a building;
   a plurality of solar panels, each of said plurality of solar panels being mounted in said housing wherein each of said plurality of solar panels is configured to be exposed to sunlight thereby converting the sunlight into electrical energy;
   a heating unit being positioned in said housing such that said heating unit is positioned beneath each of said plurality of solar panels, said heating unit being in thermal communication with each of said plurality of solar panels thereby facilitating said heating unit to heat each of said plurality of solar panels when said heating unit is turned on wherein said heating unit is configured to melt snow and ice that collects on said plurality of solar panels thereby ensuring proper functioning of said plurality of solar panels;
   a control unit being positioned in said housing, said control unit being in communication with each of said plurality of solar panels and said heating unit, said control unit having a temperature sensor wherein said temperature sensor is configured to be in thermal communication with ambient air for determining the temperature of ambient air, said control unit actuating said heating unit when said temperature sensor senses a temperature that is below a trigger temperature, said control unit de-actuating said heating unit when said temperature sensor senses a temperature that is above said trigger temperature; and
   a rechargeable battery being in communication with said control unit such that said rechargeable battery is charged by said plurality of solar panels, said rechargeable battery being in communication with said heating unit for supplying electrical power to said heating unit;
   wherein said housing has a perimeter wall extending upwardly from an upper surface of a basal wall of said housing such that said perimeter wall defines a space in said housing;
   wherein a lower surface of said basal wall defines said planar attachment surface;
   wherein said perimeter wall has a forward side and a rear side and a first lateral side and a second lateral side;
   wherein each of said plurality of solar panels has a bottom surface and a top surface and a perimeter surface extending between said top surface and said bottom surface;
   wherein said perimeter surface of each of said plurality of solar panels has a front side and a back side;
   wherein each of said plurality of solar panels is elongated between said front side and said back side;
   wherein each of said plurality of solar panels is positioned in said space defined by said perimeter wall of said housing having said bottom surface of each of said plurality of solar panels being spaced from said upper surface of said basal wall of said housing;
   wherein each of said plurality of solar panels extends upwardly beyond a top edge of said perimeter wall of said housing such that said top surface of each of said plurality of solar panels is spaced upwardly from said top edge of said perimeter wall of said housing;
   wherein said front side of said perimeter surface of each of said plurality of solar panels abuts an inwardly facing surface of said forward side of said perimeter wall of said housing;
   wherein said back side of said perimeter surface of each of said plurality of solar panels abuts an inwardly facing surface of said rear side of said perimeter wall of said housing; and
   wherein said plurality of solar panels is evenly spaced apart from each other and is distributed between said first lateral side and said second lateral side of said perimeter wall of said housing.

2. The device according to claim 1, wherein each of said plurality of solar panels has a chemically reactive layer being applied to said top surface of each of said plurality of solar panels having said chemically reactive layer completely covering said top surface of each of said plurality of solar panels.

3. The device according to claim 1, wherein said heating unit is positioned in said space defined in said housing such that said heating unit is between said bottom surface of each of said plurality of solar panels and said upper surface of said basal wall of said housing.

4. The device according to claim 3, wherein:
said control unit is positioned between said heating unit and said basal wall of said housing;
said control unit is electrically coupled to each of said plurality of solar panels; and
said heating unit is electrically coupled to said heating unit.

5. The device according to claim 1, wherein:
said rechargeable battery is remotely positioned with respect to said housing;
said rechargeable battery has a communication port;
said device includes a conductor being coupled between said housing and said rechargeable battery;
said conductor is comprised of an electrically conductive material;
said conductor has an outer shielding being comprised of an electrically insulating material such that said outer shielding inhibits electrical communication between said conductor and the environment in which said conductor is positioned; and
said conductor is electrically coupled between said control unit and said communication port of said rechargeable battery.

6. The device according to claim 2, wherein:
said device includes a spray bottle which contains a chemical reactant;
said spray bottle sprays said chemical reactant onto said chemically reactive layer on each of said plurality of solar panels when a trigger on said spray bottle is manipulated; and
said chemical reactant initiates an exothermic chemical reaction with said chemically reactive layer when said chemical reactant is applied to said chemically reactive layer wherein said chemical reactant is configured to facilitate said chemically reactive layer to melt snow and ice that has accumulated on said plurality of solar panels.

7. A heated solar panel device for inhibiting the collection of snow upon a solar panel to ensure said solar panel is continuously exposed to sunlight, said device comprising:
a housing having a planar attachment surface being attached to a roof of a building, said housing having a perimeter wall extending upwardly from an upper surface of a basal wall of said housing such that said perimeter wall defines a space in said housing, a lower surface of said basal wall defining said planar attachment surface, said perimeter wall having a forward side and a rear side and a first lateral side and a second lateral side;
a plurality of solar panels, each of said plurality of solar panels being mounted in said housing wherein each of said plurality of solar panels is configured to be exposed to sunlight thereby converting the sunlight into electrical energy, each of said plurality of solar panels having a bottom surface and a top surface and a perimeter surface extending between said top surface and said bottom surface, said perimeter surface of each of said plurality of solar panels having a front side and a back side, each of said plurality of solar panels being elongated between said front side and said back side, each of said plurality of solar panels being positioned in said space defined by said perimeter wall of said housing having said bottom surface of each of said plurality of solar panels being spaced from said upper surface of said basal wall of said housing, each of said plurality of solar panels extending upwardly beyond a top edge of said perimeter wall of said housing such that said top surface of each of said plurality of solar panels is spaced upwardly from said top edge of said perimeter wall of said housing, said front side of said perimeter surface of each of said plurality of solar panels abutting an inwardly facing surface of said forward side of said perimeter wall of said housing, said back side of said perimeter surface of each of said plurality of solar panels abutting an inwardly facing surface of said rear side of said perimeter wall of said housing, said plurality of solar panels being evenly spaced apart from each other and being distributed between said first lateral side and said second lateral side of said perimeter wall of said housing, each of said plurality of solar panels having a chemically reactive layer being applied to said top surface of each of said plurality of solar panels having said chemically reactive layer completely covering said top surface of each of said plurality of solar panels;
a heating unit being positioned in said housing such that said heating unit is positioned beneath each of said plurality of solar panels, said heating unit being in thermal communication with each of said plurality of solar panels thereby facilitating said heating unit to heat each of said plurality of solar panels when said heating unit is turned on wherein said heating unit is configured to melt snow and ice that collects on said plurality of solar panels thereby ensuring proper functioning of said plurality of solar panels, said heating unit being positioned in said space defined in said housing such that said heating unit is between said bottom surface of each of said plurality of solar panels and said upper surface of said basal wall of said housing;
a control unit being positioned in said housing, said control unit being in communication with each of said plurality of solar panels and said heating unit, said control unit having a temperature sensor wherein said temperature sensor is configured to be in thermal communication with ambient air for determining the temperature of ambient air, said control unit actuating said heating unit when said temperature sensor senses a temperature that is below a trigger temperature, said control unit de-actuating said heating unit when said temperature sensor senses a temperature that is above said trigger temperature, said control unit being positioned between said heating unit and said basal wall of said housing, said control unit being electrically coupled to each of said plurality of solar panels, said heating unit being electrically coupled to said heating unit;
a rechargeable battery being in communication with said control unit such that said rechargeable battery is charged by said plurality of solar panels, said rechargeable battery being in communication with said heating unit for supplying electrical power to said heating unit, said rechargeable battery being remotely positioned with respect to said housing, said rechargeable battery having a communication port;
a conductor being coupled between said housing and said rechargeable battery, said conductor being comprised of an electrically conductive material, said conductor having an outer shielding being comprised of an electrically insulating material such that said outer shielding inhibits electrical communication between said conductor and the environment in which said conductor is positioned, said conductor being electrically coupled between said control unit and said communication port of said rechargeable battery; and a spray bottle containing a chemical reactant, said spray bottle spraying said chemical reactant onto said chemically reactive layer on each of said plurality of solar panels when a trigger on said spray bottle is manipulated, said chemical reactant initiating an exothermic chemical reaction with said chemically reactive layer when said chemical reactant is applied to said chemically reactive layer wherein said chemical reactant is configured to facilitate said chemically reactive layer to melt snow and ice that has accumulated on said plurality of solar panels.

\* \* \* \* \*